United States Patent
Bodor et al.

(10) Patent No.: US 8,293,026 B1
(45) Date of Patent: Oct. 23, 2012

(54) FIXTURES FOR THE CLEANING OF LENSES

(75) Inventors: Zoltan A. Bodor, Plantation, FL (US);
Geoffrey B. Toon, Woodstock, GA (US);
Oscar J. Williams, Miramar, FL (US);
Peter P. Bodor, Pembroke Pines, FL (US)

(73) Assignee: Integrated Medical Systems International, Inc., Birmingham, AL (US)

( * ) Notice: Subject to any disclaimer, the term of this patent is extended or adjusted under 35 U.S.C. 154(b) by 68 days.

(21) Appl. No.: 12/768,183

(22) Filed: Apr. 27, 2010

Related U.S. Application Data (60) Provisional application No. 61/173,259, filed on Apr. 28, 2009.

(51) Int. Cl.
*B08B 3/10* (2006.01)
*B08B 1/04* (2006.01)
(52) U.S. Cl. .............................. 134/32; 134/1; 134/25.4
(58) Field of Classification Search .................. 211/41.1
See application file for complete search history.

(56) References Cited

U.S. PATENT DOCUMENTS

| 5,857,475 | A | | 1/1999 | Volk |
| 6,109,276 | A | * | 8/2000 | Smith et al. ................. 134/1.3 |
| 6,581,761 | B1 | * | 6/2003 | Stafford et al. ............... 206/5.1 |

FOREIGN PATENT DOCUMENTS

JP 11221531 A * 8/1999

OTHER PUBLICATIONS

English Machine Translation of JP 11-221531A.*

* cited by examiner

*Primary Examiner* — Michael Kornakov
*Assistant Examiner* — Nicole Blan
(74) *Attorney, Agent, or Firm* — C. Brandon Browning; Maynard Cooper & Gale, PC (57) ABSTRACT

An apparatus and method of supporting a large number of optical lenses having opposed lens surfaces and an outer peripheral area including a rotatable holder for supporting and retaining the lenses and a drive device coupled to the holder for rotatably driving the holder to centrifugally force a liquid from the surface of the lenses. The method includes positioning the lenses within the holder and retaining the rod lenses in a manner allowing all of the surfaces to be cleaned and dried without contacting the opposed lens surfaces to the holder, applying a liquid to the exposed surface of the lenses, and spinning the lenses at a high rate of speed to clean and dry them. To increase the effectiveness of the apparatus, the drive device can include ultrasonic transducers for ultrasonically cleaning the rod lenses while they are held within the holder.

18 Claims, 12 Drawing Sheets

FIXTURES FOR THE CLEANING OF LENSES

RELATED APPLICATION

The present application claims priority to U.S. provisional patent application Ser. No. 61/173,259, the entire contents of which are incorporated herein by reference.

FIELD OF INVENTION

The present invention relates to an apparatus for ultrasonically cleaning and drying individual optical lenses.

BACKGROUND OF THE INVENTION

Devices for cleaning optical lenses are described in U.S. Pat. No. 6,581,761 to Stafford et al., U.S. Pat. No. 6,109,276 to Smith et al. and U.S. Pat. No. 5,857,475 to Volk. Stafford et al. disclose a tray assembly for holding small devices such as polymeric ophthalmic lenses. The tray assembly includes a mesh insert having a plurality of wells for containing individual lenses and a support tray having a perimeter substantially conforming in shape to the outer edge of the mesh insert. Contact is maintained between the support tray and the mesh insert to confine the lenses within the assembly. A stack assembly includes a plurality of multiwell circular mesh trays and corresponding mesh tray covers stacked and secured on a center shaft and provides substantially enhanced efficiency and productivity in processes such as extraction or hydration.

Smith et al. disclose a process and machine for cleaning ophthalmic lenses and blocks including heating a washing solution in a wash tank and a rinsing solution in a rinse tank to approximately 140° F. Ultrasonic wave agitation is then initiated in the solutions. A set of lenses or blocks is immersed in the ultrasonically agitated washing solution for approximately one-half the predetermined time of the wash cycle. Mechanical agitation of the immersed set of lenses or blocks is initiated in the ultrasonically agitated washing solution for the remainder of the predetermined time of the wash cycle. The set of lenses or blocks is then raised above the washing solution for a predetermined drip period. The set of lenses or blocks is then immersed in the ultrasonically agitated rinsing solution for approximately one-half the predetermined time of the rinse cycle. Mechanical agitation of the immersed set of lenses or blocks is initiated in the ultrasonically agitated rinsing solution for the remainder of the predetermined time of the rinse cycle. The set of lenses or blocks is then raised above the rinsing solution for a predetermined drip period.

Volk discloses an apparatus and method for cleaning an optical component having opposed lens surfaces and an outer peripheral area. The apparatus includes a rotatable holder for supporting and retaining the optical component via the outer peripheral area so that at least a useful optical area of at least one of the opposed surfaces is fully exposed to air when the holder and optical component are rotated. A drive device is provided coupled to the holder for rotatably driving the holder to centrifugally force a liquid from the surface. The method includes the steps of, positioning the optical component within a holder and retaining the optical component in a region of the outer peripheral edge so that at least a useful optical area of one of the surfaces is fully exposed to air, applying a liquid to the exposed surface of the optical component, and spinning the optical component at a high rate of speed to clean and dry the optical component.

SUMMARY OF THE INVENTION

The present invention provides an apparatus and method of supporting a large number of optical lenses having opposed lens surfaces and an outer peripheral area. The apparatus includes a rotatable holder for supporting and retaining the lenses and a drive device coupled to the holder for rotatably driving the holder to centrifugally force a liquid from the surface of the lenses. The method includes the steps of positioning the lenses within the holder and retaining the rod lenses in a manner allowing all of the surfaces to be cleaned and dried without contacting the opposed lens surfaces to the holder, applying a liquid to the exposed surface of the lenses, and spinning the lenses at a high rate of speed to clean and dry them. To increase the effectiveness of the apparatus, the drive device can include ultrasonic transducers for ultrasonically cleaning the rod lenses while they are held within the holder.

DETAILED DESCRIPTION OF PREFERRED EMBODIMENT

Figure 1:
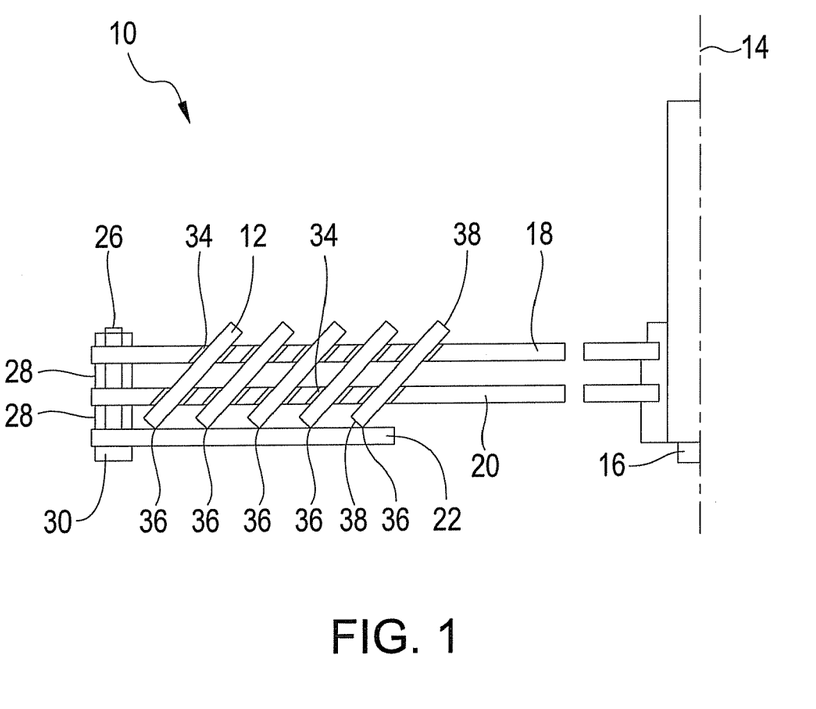
FIG. 1 is half of a symmetric cross section of a lens holder according to a first embodiment of the present invention.
Figure 2:
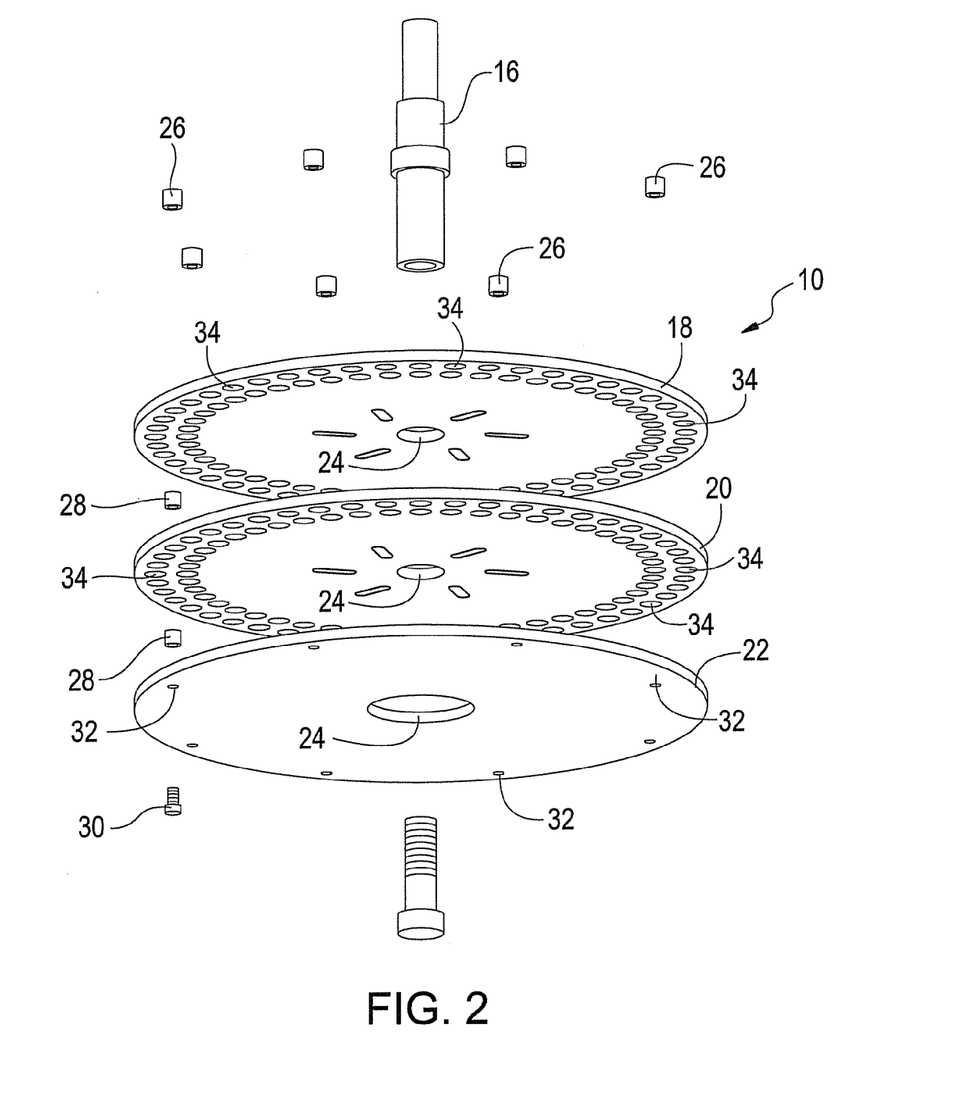
FIG. 2 is an exploded view of the holder of FIG. 1.
Figure 3:
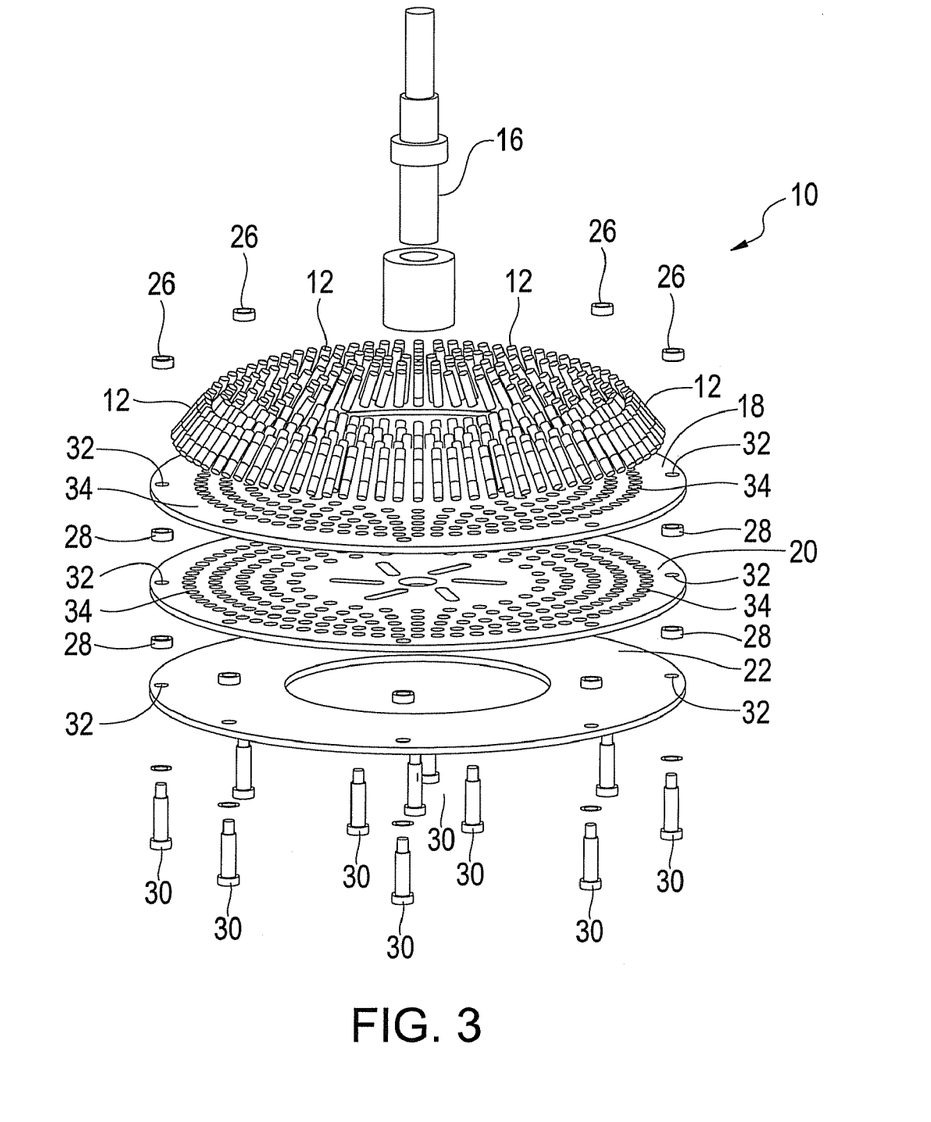
FIG. 3 is an exploded view of the holder of FIG. 1 showing lenses to be cleaned.
Figure 4:
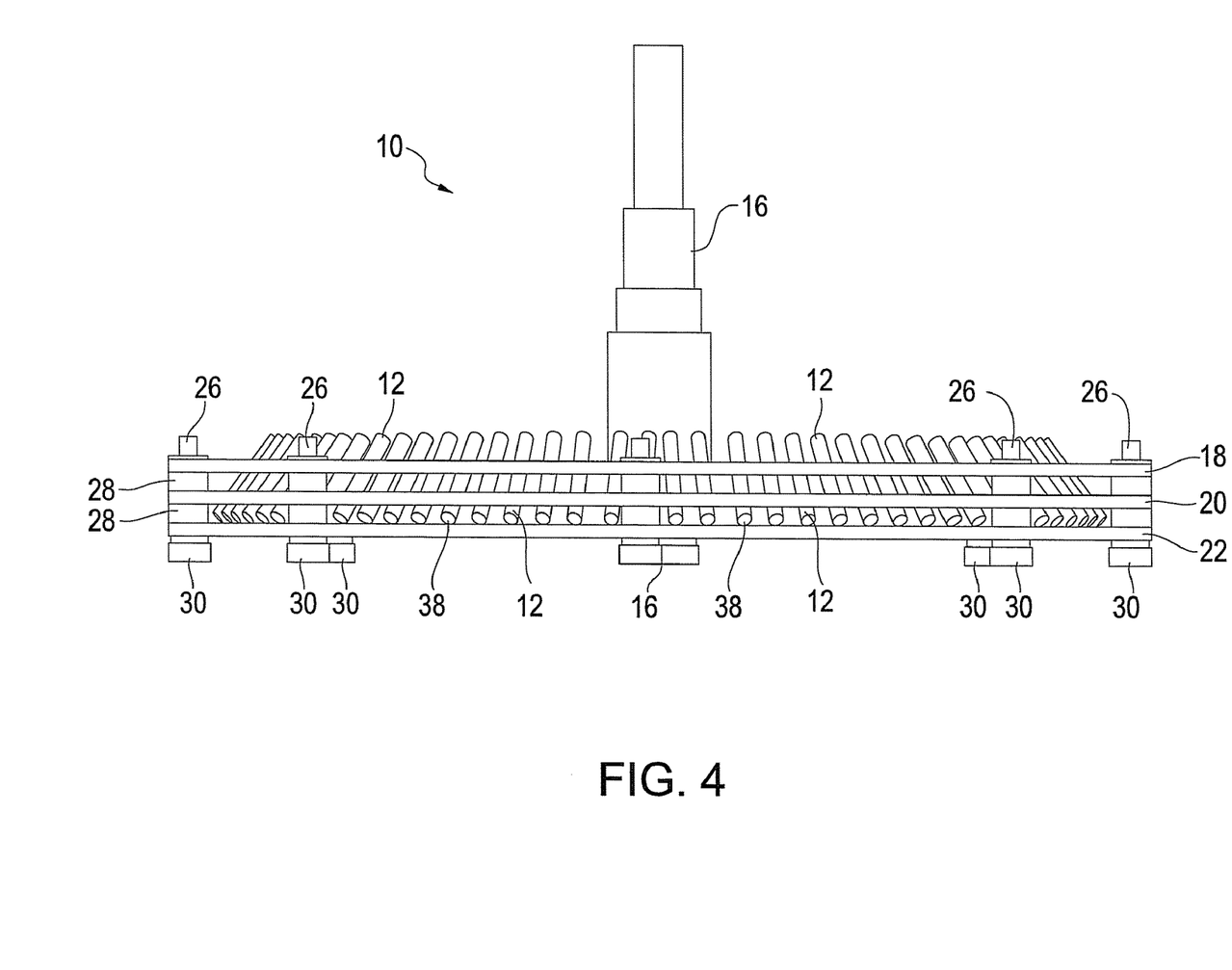
FIG. 4 is elevational view of the folder of FIG. 1 showing lenses supported by the holder.
Figure 5:
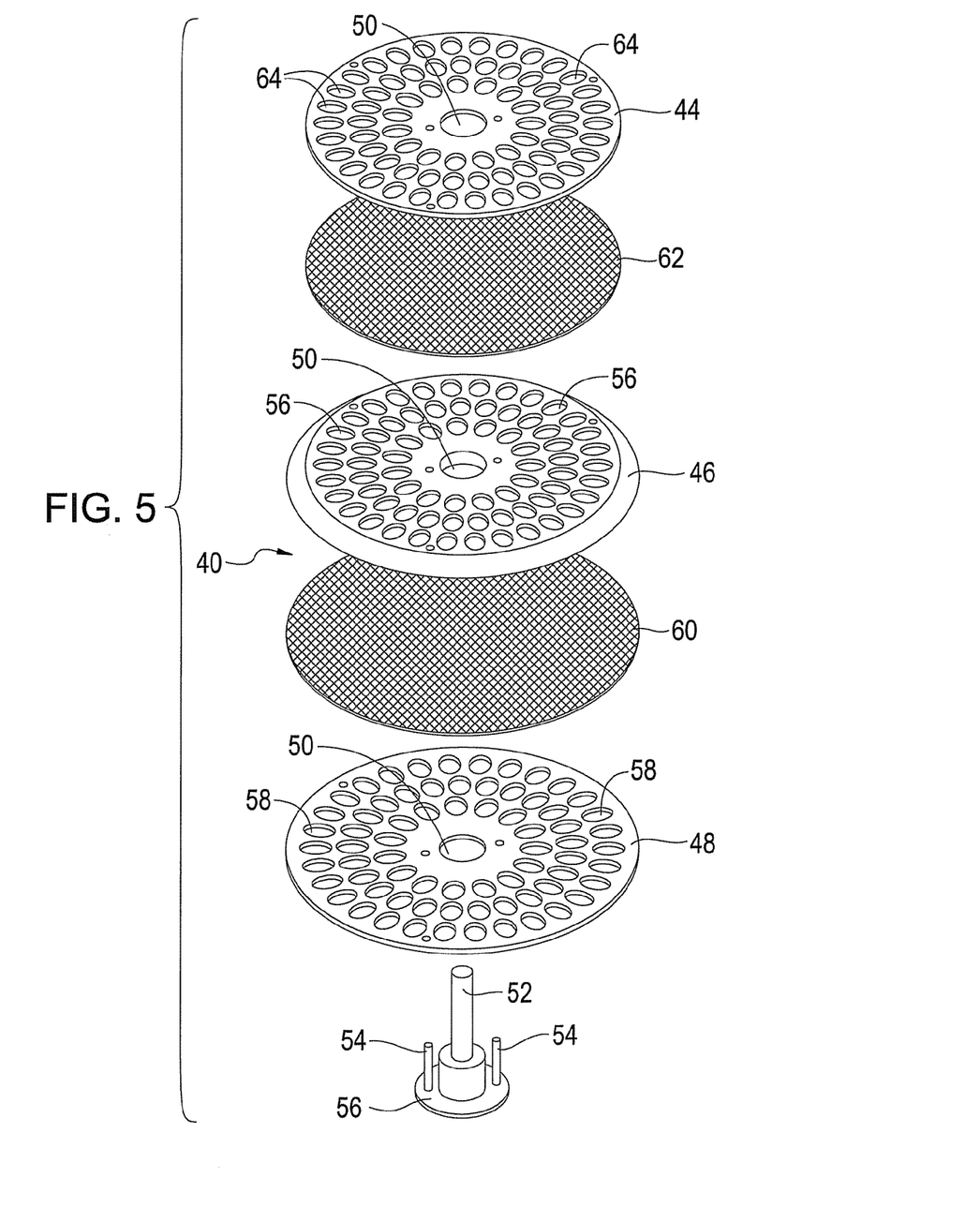
FIG. 5 is an exploded view of a lens holder according to a second embodiment of the present invention.
Figure 6:
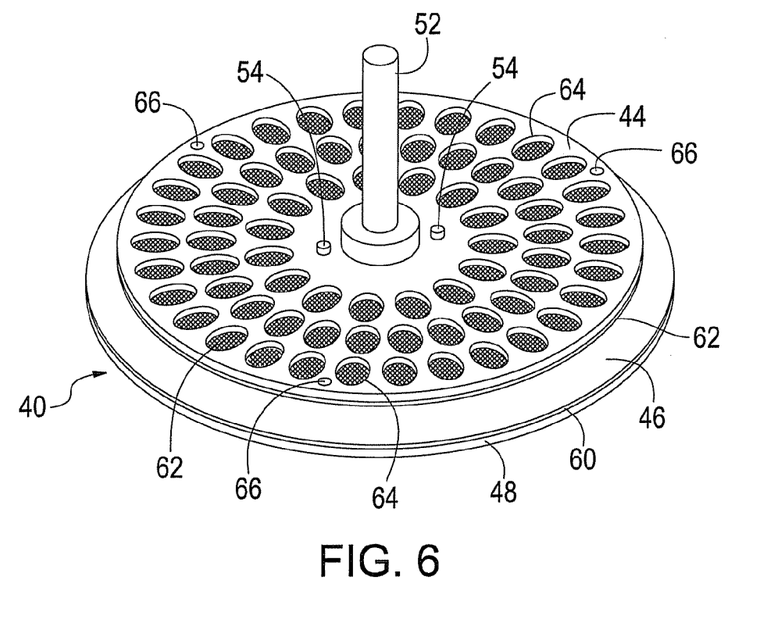
FIG. 6 is a perspective view of the holder of FIG. 5.
Figure 7:
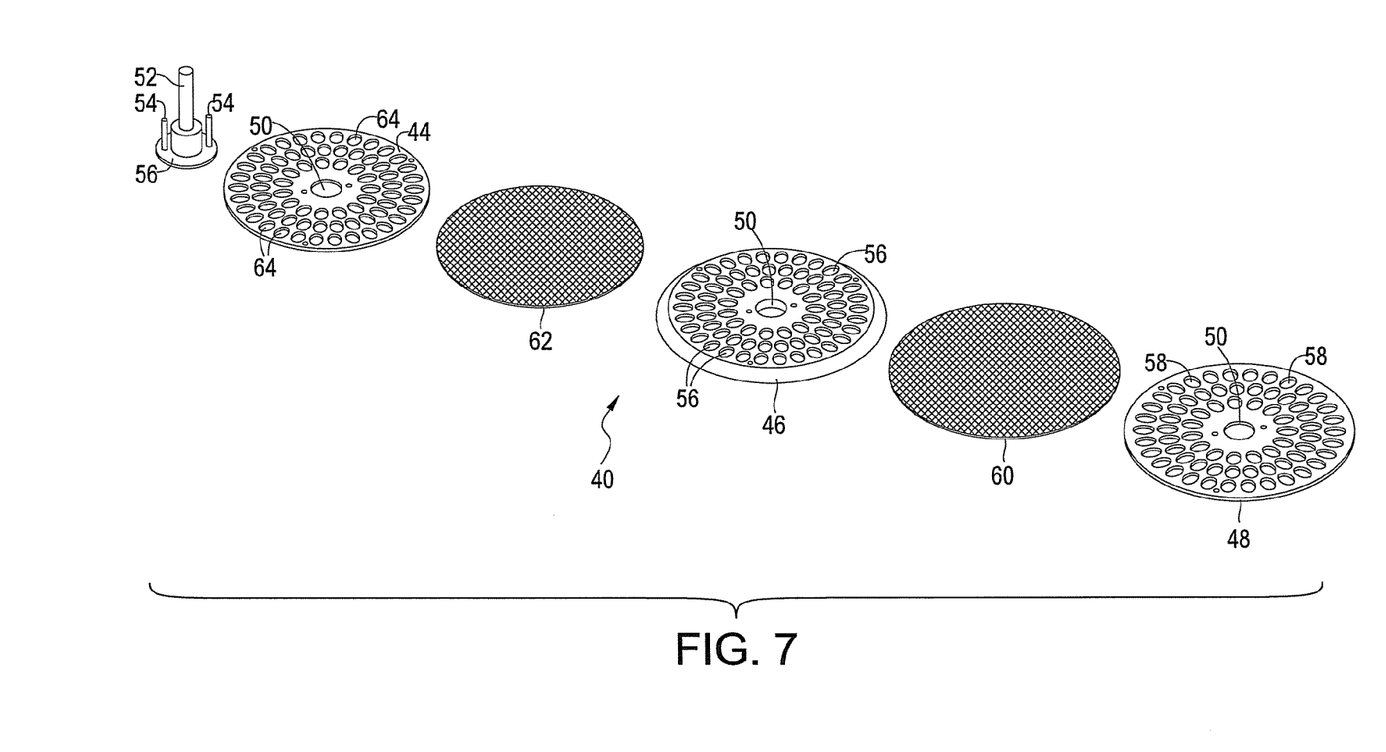
FIG. 7 is a perspective view of the various components of the holder of FIG. 5 in a disassembled state.
Figure 8:
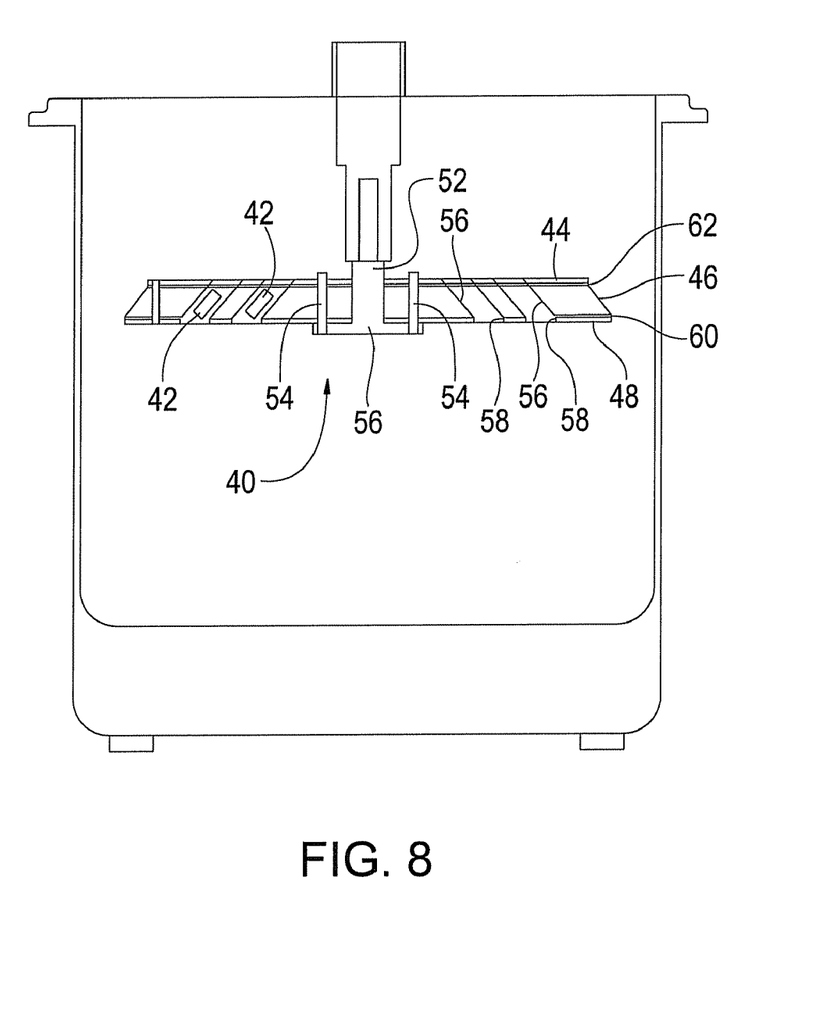
FIG. 8 is a sectional view of the holder of FIG. 5 supported within a drive device.
Figure 9:
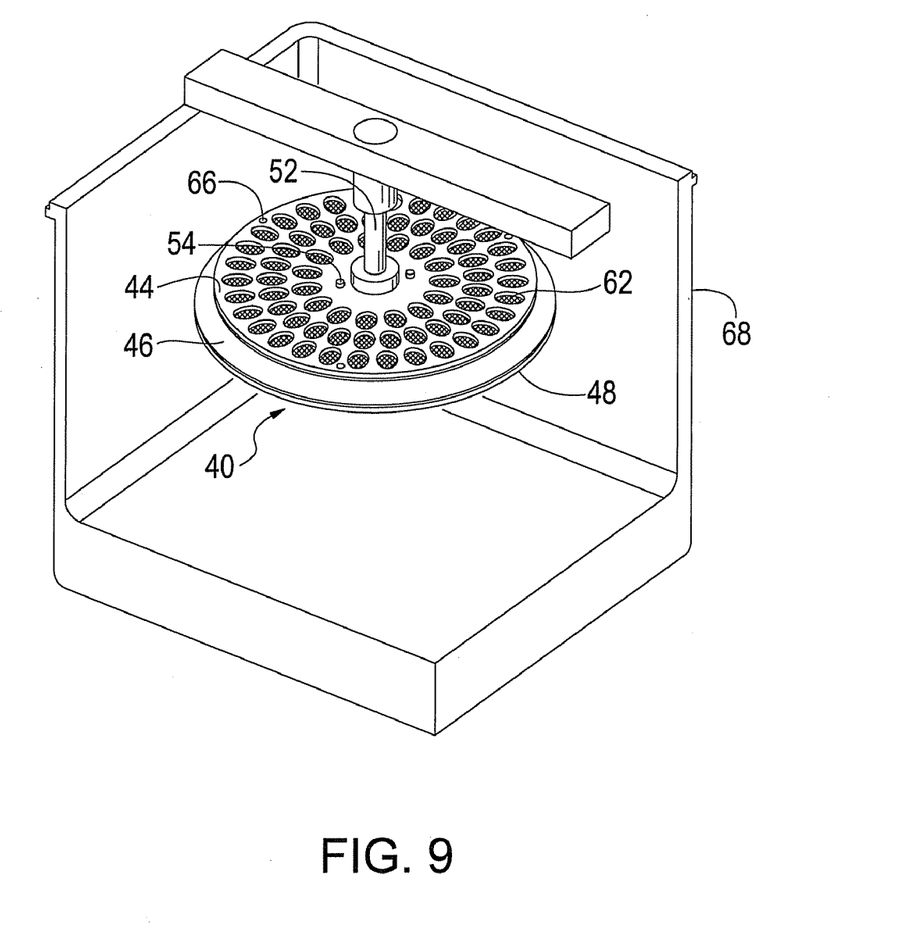
FIG. 9 is a perspective view of the holder and drive device of FIG. 8.
Figure 10:
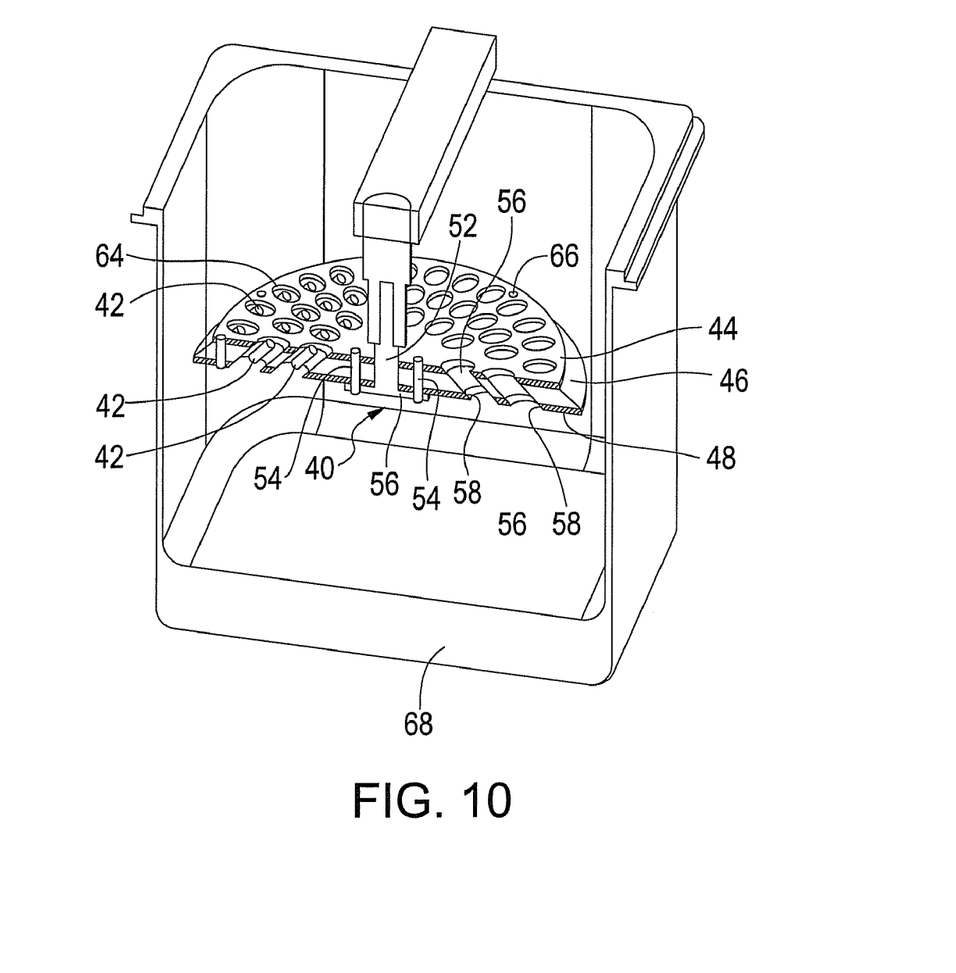
FIG. 10 is a partial sectional view of a cross-section of the holder and drive device of FIG. 8.
Figure 11:
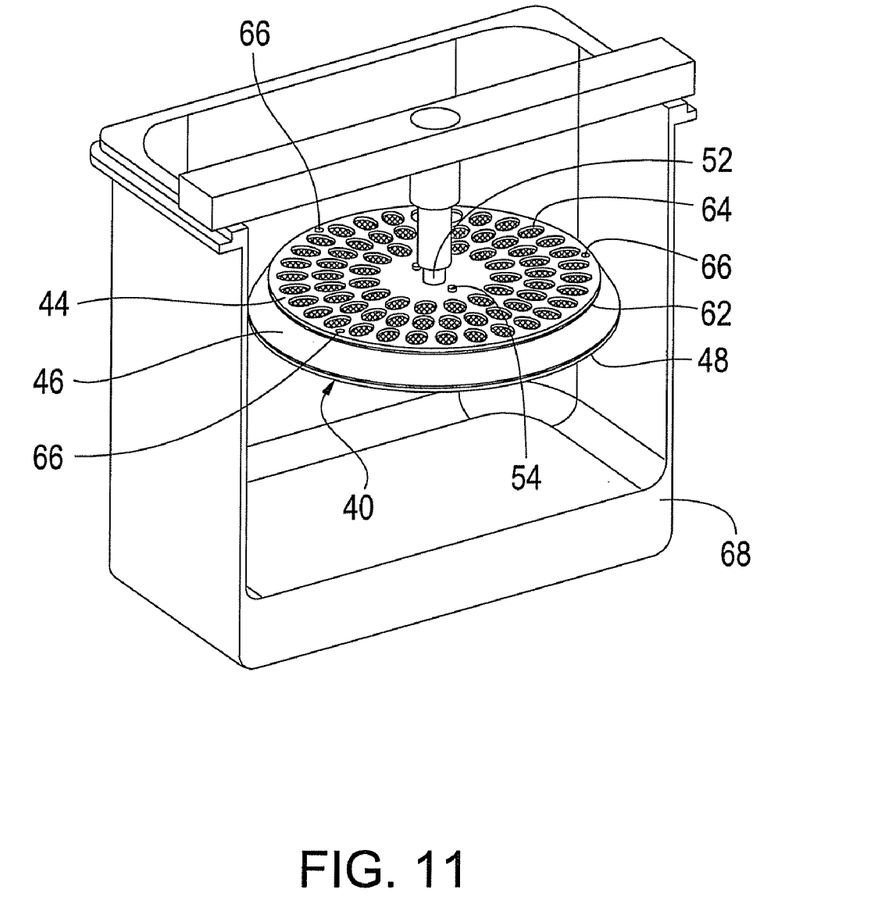
FIG. 11 is another partial sectional view of the holder of FIG. 8.
Figure 12:
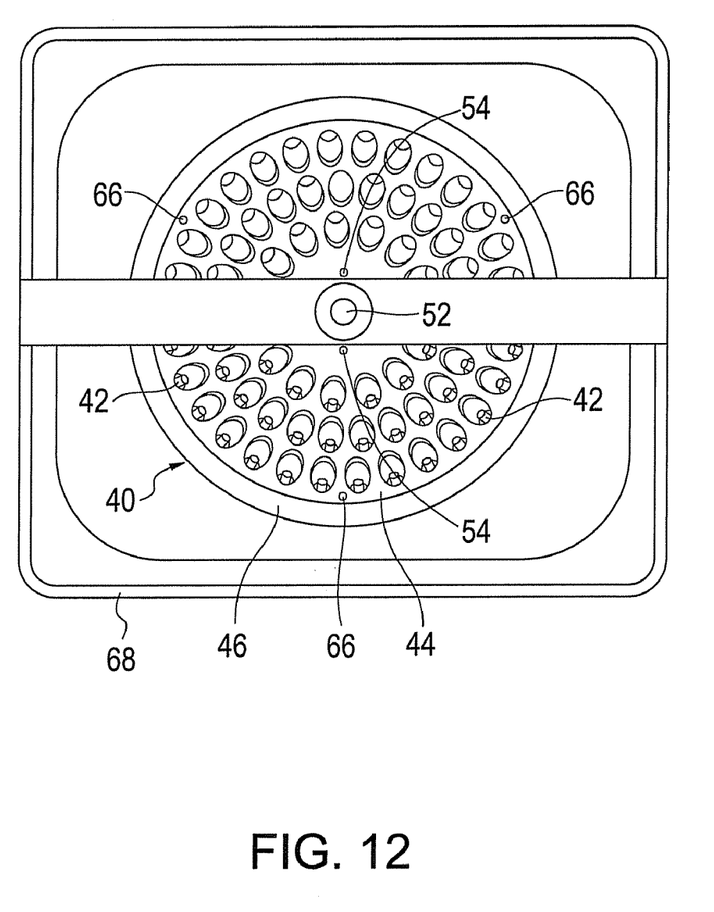
FIG. 12 is a top plan view of the holder and drive device of FIG. 8

The present invention is directed to an optical lens holder that is configured for holding optical lenses in a manner that allows an ultrasonic bath to come in direct contact with the optical surfaces of the lenses. FIGS. 1 through 4 illustrate a lens holder 10 for supporting long optical lenses 12 such as rod lenses in accordance with a first embodiment of the present invention. FIGS. 5 through 12 illustrate a lens holder 40 in accordance with a second embodiment of the present invention for supporting short optical lenses 42 such as achromats, concave or convex single lenses.

Turning to the first embodiment of the present invention, depicted in the FIGS. 1 through 4, is a lens holder 10 for supporting rod lenses 12 within a cleaning bath at a desired angle to a rotational axis 14 of the holder during lens cleaning. Lens holder 10 is rotatably supported within the bath by a driven shaft 16 which extends through axis 14 of holder 10. In particular, holder 10 is comprised of three cylindrical plates, including a top plate 18, a middle plate 20 and a bottom plate 22, that in combination form holder 10. Each of plates 18, 20 and 22 includes a central opening 24 for receiving shaft 16 and is configured to interact with a respective radial shelf on shaft 16 on which a particular plate is supported. In this manner, the spacing between plates 18, 20, and 22 about respective central openings 24 thereof is maintained at a desired distance.

Plates 18, 20 and 22 are further held together at the peripheries thereof at a desired distance from one another by a plurality of evenly placed threaded fastening components 26, spacing devices 28 and additional fastening component 30. In particular, plates 18, 20 and 22 include a plurality of holes 32 evenly spaced around the peripheries of the plates and aligned with the peripheral holes in an adjacent plate. The distance between plates 18, and 22 is set by placing cylindrical spacing devices 28 between plates 18 and 20 and plates 20 and 22 about and in line with peripheral openings 32. Spacing devices 28 are held in place by additional fastening components 30, such as threaded bolts, which are inserted through peripheral openings 32 and spacing devices 28. Fastening components 26, such as threaded nuts, are attached to the distal ends of the additional fasteners 30 for holding plates 18, 20 and 22 at a fixed distance from one another and at a desired angular displacement about rotational axis 14 of holder 10.

Top plate 18 and middle plate 20 include a plurality of aligned lens receiving holes 34 there through for receiving lenses 13. Lens receiving holes 34, shown in FIG. 1 to contain one lens 12 per hole, extend through plates 18 and 20 at a desired angle to rotational axis 14. Specifically, lens receiving holes 34 are angled to form a pathway that supports lenses 12 with the upper portion of lenses 12 being angled toward shaft 16 and the lower portion lenses 12 being angled away from shaft 16. The aligned lens receiving holes 34 serve to support the sides of lenses 12 while maintaining the lenses at an angle relative to rotational axis 14. Bottom plate 22 serves the purpose of making contact with a corner 36 of lenses 12 in order to support them within lens receiving holes 34 while holder 10 is rotating. By contacting only corner 36 of lenses 12 with bottom plate 22, the entire surfaces of the opposed lens surfaces 38 are exposed to the cleaning solution and ultrasonic cleaning.

Preferably, plates 18, 20 and 22 are made from a polymer material possessing certain characteristics. For example, the polymer material should not scratch lenses 12, and it should be sufficiently rigid to support lenses 12 and resist deformation. Further, the polymer material should resist cleaning chemicals and elevated temperatures, and it should resist absorption or moisture.

Turning to the second embodiment of the present invention, FIGS. 5 through 12 depict a lens holder 40 configured for supporting short optical lenses 42 such as achromats, concave or convex single lenses which have a center thickness close to their respective outer diameters. Lens holder 40 is composed of an upper plate 44, a middle plate 46 and a bottom plate 48 each having a central opening 50 through which a rotatable, driven shaft 52 is inserted for rotatably supporting plates 44, 46 and 48 together. A pair of opposed stabilizing bars 54 extend adjacent and axially to shaft 52 out of a base 56 coupled to the lower end of shaft 52. Opposed stabilizing bars 54 are arranged to extend through plates 44, 46 and 48 so that the plates rotate with shaft 52 as opposed to rotating around shaft 52. Base 56 at the lower end of shaft 52 serves to support a lower face of bottom plate 48.

Middle plate 46 is supported by an upper surface of bottom plate 48 and has a thickness substantially equal to the length of lens 42 to be cleaned. Extending between the upper and lower surfaces of middle plate 46 are a plurality of lens receiving holes 56 that are provided at a desired angle to the rotational axis of shaft 52 and holder 40 and that are aligned with complimentary holes 58 through bottom plate 48. This angled arrangement supports the sides of lenses 42. Situated between bottom plate 48 and middle plate 46 is bottom mesh 60. Bottom plate 48 serves the purpose of supporting bottom mesh 60 under the middle plate 46. This arrangement allows lenses 42 supported within the lens receiving holes 56 of middle plate 46 to contact bottom mesh 60 at a corner of lenses 42 and provides access through bottom mesh 60 to the bottom optical surfaces of lenses 42 to cleaning fluid and ultrasonic waves which enter through holes 58 of bottom plate 48 to contact the bottom optical surface of lenses 42 Similarly, upper plate 44 and an upper surface of middle plate 46 serve to support a top mesh 62 therebetween. Upper plate 44 has a plurality of holes 64 that are aligned with lens receiving holes 56 of middle plate 40. This allows lenses 42 supported within the lens receiving holes 56 of middle plate 48 to be enclosed within holes 55 of middle plate 48 between top mesh 60 and bottom mesh 62 and provide access to the top optical surface of lenses 42 to cleaning fluid and ultrasonic waves which enter through holes 64 of top plate 44 and top mesh 62 to contact the upper optical surfaces of lenses 42

As depicted in FIGS. 5 through 12, lenses 42 are held by holder 40 at a given angle to the rotational axis of holder 40. Lens holder 40 is held during rotation by shaft 52. At the outer perimeter, there are a plurality of evenly placed threaded fastening components 66. These fasteners 66 hold plates 44, 46 and 48 and meshes 60 and 62 about the rotational axis of holder 40.

Plates 44, 46 and 48 are preferably made from a polymer material which must possess key characteristics. The polymer material should not scratch lenses 42, and it should be sufficiently rigid to support lenses 42 and resist deformation. The polymer material should also resist cleaning chemicals and elevated temperatures and absorption of moisture. Further, meshes 60 and 62 should be sufficiently strong to support and contain lenses 42 within lens holder 40 and sufficiently permeable to cleaning fluid and ultrasonic energy or waves. This way, cleaning fluid and ultrasonic waves can contact the opposed optical surfaces of lenses 42 supported within lens holder 40.

In use, top plate 44 and top mesh 62 are removed from lens holder 40 and lenses 42 are inserted into lens receiving holes 56 in middle plate 46. Top mesh 62 is placed on top of middle plate 46 and secured thereto by coupling top plate 44 to middle plate 46 using fastening components 66. Lens holder 40 is then inserted into a conventional, ultrasonic cleaner 68 containing a cleaning fluid and rotated. As cleaner 68 is rotated, ultrasonic transducers integral with cleaner 68 impact the opposed optical surface of lens 42 with ultrasonic waves for dislodging debris from lenses 42 as the cleaning fluid is circulated there across. After cleaning, the cleaning fluid can be removed from cleaner 68 and lens holder 40 rotated to removed fluid from the lens surfaces.

With regard to the second embodiment of the invention, lenses 42 may be of different diameters and shapes. Thus, unlike in lens holder 10 where rod lenses 12 would break from tumbling if not properly supported, lenses 42 may not be supported by the shapes of holes 56 in middle plate 46. This can occur when lenses 42 are considerably smaller than holes 56, therefore allowing lenses 42 to tumble within holes 56, for example, when ultrasonic energy is applied. Tumbling may or may not be preferred since in certain instances it can damage lenses 42. Accordingly, in this instance, the angles of the holes are not relevant for supporting lenses 42 at a desired angle relative to bottom mesh 60. Instead, the angles of holes 56 are provided for allowing cleaning fluid to be driven outside of holes 56 more efficiently when lens holder 40 is rotated. In other words, the cavities consisting of the individual (oblique) holes 56 and the top mesh 62 and bottom mesh 60 works as a cage, separating one lens from the other. When lenses 42 have a diameter ranging between 4 mm and 6 mm, it is preferred that holes 56 of plate 46 and optionally plates 44 and 48, into which they are deposited, have a diameter of about 8 mm. When lenses 42 have a diameter ranging about 1.2 mm, it is preferred that holes 56 of plate 46 and optionally plates 44 and 46, into which they are deposited, have a diameter of about 2 mm to 3 mm.

Modifications and other embodiments of the invention will be apparent to those skilled in the art to which this invention relates having the benefit of the foregoing teachings, descriptions and drawings the present invention is not limited to the specific embodiments disclosed, but is to include modifications and other embodiments which are within the scope of the appended claims.

It is claimed:

1. A method for cleaning a lens having an upper opposing face and a lower opposing face, a continuous sidewall extending there between and a lower edge formed by the intersection of the lower opposing face and the continuous sidewall, the method comprising,
    providing a lens holder having a lower support member and a lens receiving passageway having a substantially vertical axis that extends towards a rotational axis of the lens holder, and
    supporting the lens within the passageway on the lower support member,
    wherein the lower edge contacts the lower support member at a single spot along the lower edge.

2. The method according to claim 1 further comprising immersing the lens holder in a cleaning solution, rotating the lens holder and circulating the cleaning solution across essentially the entire upper and lower opposing face of the lens.

3. The method according to claim 2 further comprising impacting essentially all of the lower opposing face of the of the lens with ultrasonically agitated cleaning solution.

4. The method according to claim 1 wherein the lower support member is a first mesh.

5. The method according to claim 4 further comprising extending a second mesh over the a top end of the passageway.

6. The method according to claim 1 further comprising supporting the lens on the lower support member without the lower opposing face contacting the lower support member.

7. The method according to claim 1 wherein the lens is a rod lens.

8. The method according to claim 1 wherein the lower edge is circular.

9. The method according to claim 1 further comprising maintaining the lens tilted toward a rotational axis of the lens holder so that an upper edge of the lens is positioned closer to the rotational axis than a lower edge of the lens.

10. The method according to claim 1 further comprising positioning the upper opposing face of the lens closer to a rotational axis of the lens holder than the lower opposing face of the lens.

11. A method for cleaning a lens having upper and lower opposing faces and a continuous sidewall extending there between comprising,
    providing a lens holder having a lower support member and a lens receiving passageway having a substantially vertical axis that extends towards a rotational axis of the lens holder, wherein the lower support member is a first mesh,
    supporting the lens within the passageway on the lower support member,
    extending a second mesh over the a top end of the passageway,
    inserting the first mesh between a lower plate having a first hole opening into the lens receiving passageway and a middle section of the lens holder and inserting the second mesh between the middle section of lens holder and an upper plate having a second hole opening into the passageway,
    wherein only an edge of the lower opposing face contacts the lower support member.

12. A method of cleaning a lens comprising,
    placing the lens in a lens receiving passageway of a rotatable lens holder and maintaining the lens tilted toward a rotational axis of the lens holder so that an upper edge of the lens is positioned closer to the rotational axis than a lower edge of the lens,
    supporting the lower edge of the lens on a lower support member of the lens holder so that only a single portion of the lower edge contacts the lower support member and whereby a lower face of the lens remains exposed,
    immersing the lens holder in a cleaning bath, and
    rotating the lens holder about the rotational axis,
    wherein the cleaning bath is circulated across essentially the entire lower face of the lens.

13. The method according to claim 12 further comprising placing the lens between a first mesh which extends across an upper end of the lens receiving passageway and a second mesh which extends across a lower end of the lens receiving passageway and circulating the cleaning bath through the first mesh and the second mesh.

14. The method according to claim 12 further comprising separating the lens holder from the cleaning bath and drying the lens by rotating the lens holder.

15. The method according to claim 12 further comprising supporting the lens on the lower support member without the lower face contacting the lower support member.

16. The method according to claim 12 wherein the lens is a rod lens.

17. The method according to claim 12 wherein the lower edge of the lens is circular.

18. The method according to claim 12 further comprising entirely covering a lower end of the lens receiving passageway with the lower support member.

* * * * *